(12) United States Patent
Avery et al.

(10) Patent No.: US 6,406,517 B1
(45) Date of Patent: Jun. 18, 2002

(54) DESIGNED SELECTIVITY GAS PERMEABLE MEMBRANES

(75) Inventors: Daniel Lee Avery, New Castle; Purushottam V. Shanbhag, Claymont, both of DE (US)

(73) Assignee: CMS Technology Holdings, Inc., Wilmington, DE (US)

( * ) Notice: Subject to any disclaimer, the term of this patent is extended or adjusted under 35 U.S.C. 154(b) by 32 days.

(21) Appl. No.: 09/658,187

(22) Filed: Sep. 8, 2000

(51) Int. Cl.[7] .......................... B01D 53/22; B01D 71/32
(52) U.S. Cl. ................ 95/45; 95/48; 95/51; 95/53; 95/54; 96/13; 96/14; 55/524; 55/DIG. 5
(58) Field of Search ................ 95/45, 47–55; 96/4, 13, 14; 55/524, DIG. 5

(56) References Cited

U.S. PATENT DOCUMENTS

| | | | |
|---|---|---|---|
| 4,230,463 A | | 10/1980 | Henis et al. ............... 55/16 |
| 4,751,104 A | | 6/1988 | Kulprathipanja et al. ..... 427/57 |
| 4,828,585 A | * | 5/1989 | Chiao ..................... 95/47 |
| 4,983,191 A | * | 1/1991 | Ekiner et al. ................ 96/14 |
| 5,051,113 A | * | 9/1991 | Nemser ..................... 95/54 |
| 5,051,114 A | | 9/1991 | Nemser et al. ............... 55/16 |
| 5,053,059 A | * | 10/1991 | Nemser ..................... 95/54 |
| 5,147,417 A | * | 9/1992 | Nemser ..................... 95/54 |
| 5,215,554 A | * | 6/1993 | Kramer et al. .............. 96/4 X |
| 5,288,304 A | * | 2/1994 | Koros et al. ............... 96/13 X |
| 5,462,586 A | * | 10/1995 | Sugiyama et al. .......... 96/14 X |
| 5,868,992 A | * | 2/1999 | Roman ..................... 95/45 X |
| 6,126,721 A | * | 10/2000 | Nemser et al. .............. 96/4 X |

OTHER PUBLICATIONS

Ruiz–Trevino, F.A., Paul, D.R., Gas Permselectivity Properties of High Free Volume Polymers Modified by a Low Molecular Weight Additive, Journal of Applied Polymer Science, vol. 68, pp. 403–415 (1998).

* cited by examiner

Primary Examiner—Robert H. Spitzer
(74) Attorney, Agent, or Firm—Jeffrey C. Lew

(57) ABSTRACT

The separation factor with respect to a gas binary of a selectively gas permeable membrane of a fluoropolymer can be increased by fabricating the membrane from a composition of a blend of the fluoropolymer with a nonfugitive, nonpolymeric fluorinated adjuvant. The composition can be made by dissolving the adjuvant and the polymer in a suitably compatible solvent then forming the membrane from the solution for example by casting, dipping, or spraying the solution on a substrate and devolatilizing the solvent. The extent of the selectivity increase varies widely with the combination of fluoropolymer and adjuvant and largely increases in direct relation with the proportion of adjuvant in the membrane composition. Novel membranes of fluoropolymers adapted for separation of chemically aggressive gases can be made to have higher selectivity than previously available from the adjuvant free fluoropolymers

19 Claims, 1 Drawing Sheet

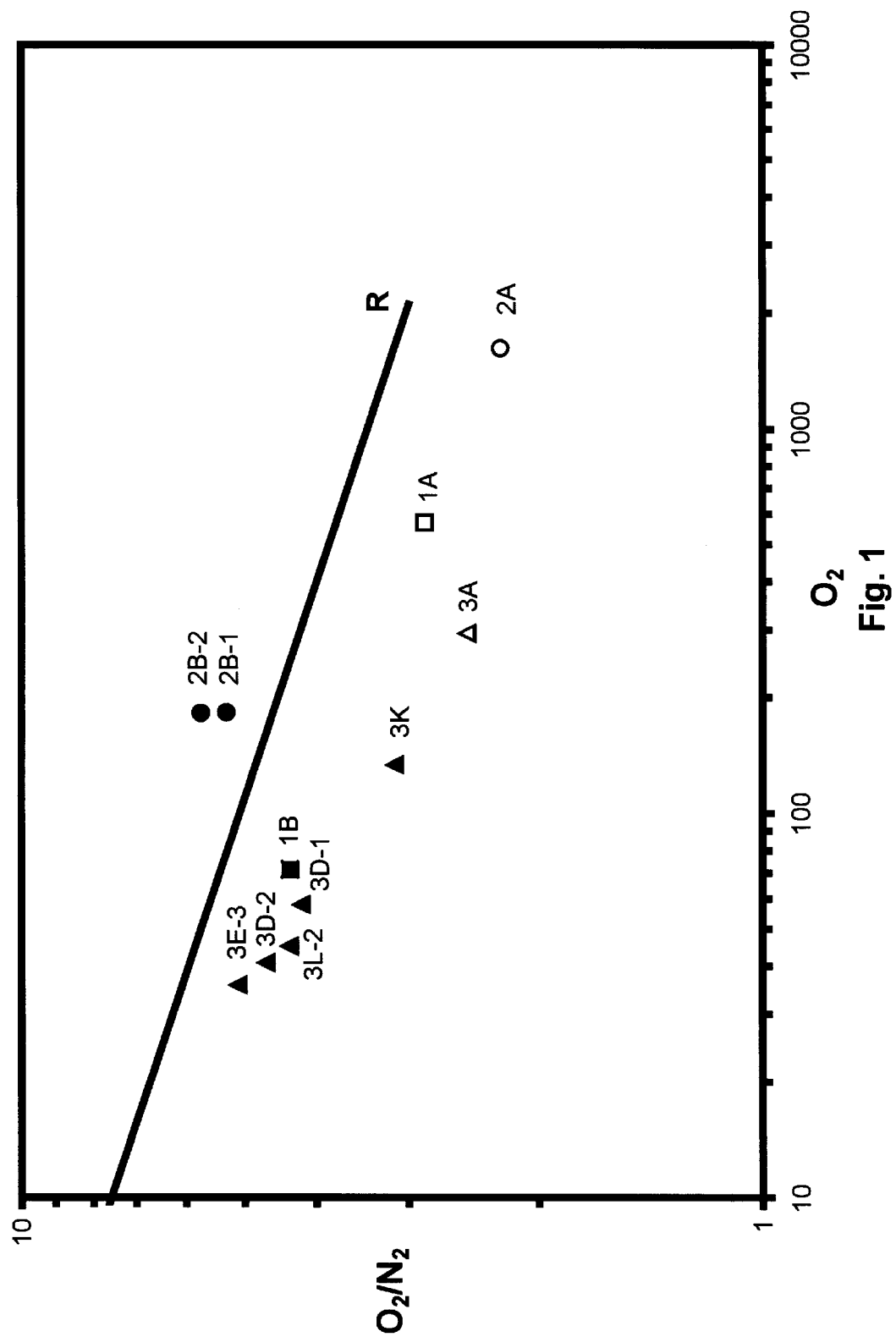

DESIGNED SELECTIVITY GAS PERMEABLE MEMBRANES

This invention was made with Government support under contract No. 9860367 awarded by the National Science Foundation. The Government has certain rights in the invention.

FIELD OF THE INVENTION

This invention relates to selectively gas permeable membranes and more specifically to a process for making a polymer membrane of a predetermined selectivity with respect to a binary gas combination by blending a separation performance altering substance with the membrane polymer composition.

BACKGROUND OF THE INVENTION

Separating the components of a gas mixture by contacting the mixture with a membrane that is selectively permeable for the components is a well established and highly valued commercial chemical process unit operation. In such a process, the permeabilities through the membrane of the components to be separated are different. The more preferentially permeable components (i.e., those of higher permeability) permeate faster than the less preferentially permeable components. Hence, the faster permeating components concentrate in the membrane permeate composition.

Through careful design of membrane separation parameters such as membrane composition, gas transfer area, membrane thickness, and equipment configuration (e.g., multiple staging and recycling), and operating conditions such as temperatures, pressures and flow rates, it is often possible to obtain product gases of desired component purity from starting gas mixtures. Selectivity of the membrane for individual components in the mixture is a fundamental if not the primary factor which determines the efficiency of a membrane separation process.

The selectivities of diverse selectively gas permeable membrane candidate compositions have been studied extensively. An important study by L. Robeson (Journal of Membrane Science, 62, pp. 165–185, 1991) correlated selectivity to permeability by plotting the logarithm of separation factor (ie., ratio of permeability of the more preferentially permeable component of a specific gas binary to the permeability of the other gas) versus the logarithm of permeability of the more preferentially permeable component for many polymeric membranes. This correlation is sometimes referred to as a "Robeson plot".

For any given gas binary, for example, $He/H_2$, $O_2/N_2$ and $CH_4/CO_2$, the performance of each polymeric membrane composition is represented by a single point on the Robeson plot. Robeson plots further demonstrate that for any gas binary there is an inverse linear log-log relationship for the upper bound of separation factor versus permeability through polymer membranes. That is, all the empirically determined data points lie below a negatively sloped line. For example, the limit line of a Robeson plot for the oxygen-nitrogen gas binary is shown as R in FIG. 1.

It was traditionally understood that each membrane composition has but one intrinsic selectivity for a given mixture of gases to be separated under fixed conditions such as temperature and pressure. Moreover, it is not always possible to choose freely among the many known gas permeable polymeric membrane candidate compositions to obtain optimized selectivity versus permeability characteristics. This is because the components of certain gas mixtures can be aggressively reactive with or corrosive to most membrane materials that have desirable separation properties. The separation of chlorine from hydrogen in chlor-alkali processes and of hydrogen fluoride from various gas mixtures in the synthesis of fluorocarbons for the refrigerant industry are typical examples in which the ability of the membrane to resist attack by the gases significantly affects the choice of membrane.

It would thus be desirable to alter the separation characteristics with respect to a given set of gases of a given membrane polymer without changing the basic polymer composition. Such an ability is wanted to provide one membrane type with different selectivity/permeability combinations suited to correspondingly different separation operating conditions. It is also desireable to increase the versatility of highly valued membrane polymers by rendering them useful under a greater range of separation performance requirements. It is especially desirable to adjust the separation characteristics of membrane polymers, such as fluoropolymers, for use in chemically aggressive fluid environments where the selection of alternative membrane materials is limited.

SUMMARY OF THE INVENTION

The present invention is directed to separation of components of a gas mixture by permeating the components through a selectively gas permeable nonporous membrane formed from a polymer composition of a uniform blend comprising as a major fraction a fluoropolymer and a nonfugitive, nonpolymeric, fluorinated adjuvant. Accordingly, there is provided a membrane composition for separation of components of a mixture including a more preferentially permeable gas and a less preferentially permeable gas of a binary gas combination comprising a nonporous gas permeable membrane of a blend comprising about 50–99 wt % of a fluoropolymer and an amount of a nonfugitive, nonpolymeric fluorinated adjuvant effective to produce a separation factor of the membrane with respect to the two gases of the binary gas combination greater than the separation factor of a membrane consisting essentially of the fluoropolymer.

There is also provided a gas separation device comprising a selectively gas permeable membrane having a membrane separation factor with respect to two gases, the membrane comprising a uniform blend of a major fraction of a fluoropolymer of which a nonporous membrane exhibits a fluoropolymer separation factor with respect to the two gases, and an amount of a nonfugitive, nonpolymeric fluorinated adjuvant effective to make the membrane separation factor greater than the fluoropolymer separation factor.

This invention further provides a process for making a gas separation membrane comprising the steps of mixing a fluoropolymer comprising a monomer selected from the group consisting of tetrafluoroethylene, chlorotrifluoroethylene, perfluoro-2,2-dimethyl- 1,3

-dioxole, 2,2,4-trifluoro-5-trifluoromethyl- 1,3-dioxole hexafluoropropylene, vinylidene fluoride and a perfluoroalkylvinyl ether, and a nonfugitive, nonpolymeric fluorinated adjuvant to obtain a uniform composition of which the fluoropolymer comprises a major fraction, and fabricating a nonporous gas permeable membrane of about 0.05 - 50 μm thickness from the composition.

Still further there is provided a process for separating gases present in a gas mixture comprising contacting the gas mixture with one side of a selectively gas permeable membrane having a membrane separation factor with respect to two gases in the mixture, the membrane comprising a uniform blend of a major fraction of a fluoropolymer of which a nonporous membrane exhibits a fluoropolymer separation factor with respect to the two gases, and an amount of a nonfugitive, nonpolymeric fluorinated adjuvant having an atmospheric boiling point at least about 200° C., the amount being effective to make the membrane separation factor greater than the fluoropolymer separation factor.

BRIEF DESCRIPTION OF THE DRAWINGS

FIG. 1 is a "Robeson" plot of oxygen/nitrogen selectivity versus oxygen permeability for several selectively gas permeable membranes.

DETAILED DESCRIPTION

In one aspect the present invention involves an improvement in membrane separation technology by which the separation factor of a nonporous membrane formed from a fluoropolymer with respect to a pair of gases can be substantially changed by blending a nonfugitive, nonpolymeric fluorinated adjuvant with the polymer prior to forming the membrane. The extent of change is in direct relation with the amount of adjuvant added. That is, the separation factor becomes higher as the proportion of adjuvant in the blend increases. The separation factor increase is defined in reference to the separation factor for the pair of gases that is exhibited by a nonporous membrane composed of the fluoropolymer free of the adjuvant.

The term "separation factor", occasionally referred to as "selectivity" of a membrane with respect to the pure gases of a binary gas combination means the ratio of the permeability through the membrane of the more preferentially permeable gas of the two gases to the permeability through the membrane of the less preferentially permeable gas. Permeability of a gas through a membrane is the measure of the rate of transmembrane flux of the gas per unit gas transfer area, per unit membrane thickness and pressure gradient of the gas across the membrane. Therefore permeability and selectivity of a nonporous membrane to any pair of gases are physical properties of the membrane composition and not a particular nonporous membrane structure. However, the composition must be formed into a nonporous membrane to measure its permeability.

The pair of gases referred to in the definition of the invention are not limiting or critical. That is, the measurement of permeability and selectivity does not depend on use of one specified standard gas binary such as oxygen and nitrogen. The invention is applicable to any pair of gases provided that the nonporous membrane of the fluoropolymer subject to selectivity modification must demonstrate at least some selectivity between the chosen gases.

Additionally, definition of the invention in terms of a binary combination of two gases is not intended to limit applicability to mixtures of only two gases. It is contemplated that membrane separation in accordance with this invention can be carried out on mixtures of three or more gases. Usually in such three or more gas mixtures the membrane will have different selectivities for each different binary combination of component gases so that the gases can be ranked in order of rate of permeation through a single membrane. In such a case, multiple membranes may be used to effectively isolate one component from a many component gas mixture.

The term "gas" is intended to encompass compositions of matter which are in the gaseous state at the conditions which exist while the compositions are in contact with the membrane. For example, it is contemplated that this invention is suitable for separating water vapor from other gases in a humid gas mixture.

The fluoropolymer for use in this invention should be a polymer of monomers including preferably a fluorine-substituted dioxole monomer and more preferably a perfluorinated dioxole monomer. The polymer can be a copolymer of comonomers that include at least one fluorine-substituted dioxole monomer and one or more non-dioxole monomer. The non-dioxole monomer can be fluorine substituted. Representative fluorine-substituted and perfluorinated dioxole monomers suitable for use in this invention include 2,2,4-trifluoro-5-trifluoromethoxy- 1,3-dioxole ("TTMD") and perfluoro-2,2-dimethyl-1,3-dioxole ("PDD"). Other perfluorinated dioxole monomers are disclosed in U.S. Pat. No. 4,565,855 of B. C. Anderson, D. C. England and P. R. Resnick, which issued Jan. 21, 1986. Representative non-dioxole comonomers include tetrafluoroethylene("TFE"), chlorotrifluoroethylene ("CTFE"), perfluoromethyl vinyl ether, perfluorodivinyl ether, vinylidene fluoride, vinyl fluoride, and hexafluoropropylene. Examples of fluoropolymers suitable for use in this invention include PDD homopolymer, TTMD homopolymer, PDD-CTFE copolymer and PDD/TFE/maleic anhydride ("MA") copolymer. In certain preferred embodiments, the fluoropolymer is a dipolymer of PDD and a complementary amount of TFE, especially such a polymer containing 50–95 mole % of PDD. Examples of these dipolymers are described in further detail in U.S. Pat. No. 4,754,009 of E. N. Squire, which issued on Jun. 28, 1988; and U.S. Pat. No. 4,530,569 of E. N. Squire, which issued on Jul. 23, 1985. The disclosures of all of the above-enumerated U.S. patents are hereby incorporated herein by reference.

The nonfugitive, nonpolymeric fluorinated adjuvant is a low molecular weight monomeric or oligomeric fluorine substituted organic compound. The term "oligomeric" means that the compound has at most about 20 repeating units. The adjuvant preferably is of physical form of liquid or semi-solid to glassy solid at room temperature. The liquid can be as viscous as a heavy oil. By "semi-solid to glassy solid" is meant that the adjuvant might instantaneously appear solid but will flow, albeit extremely slowly, to conform to the shape of its container under force of gravity and especially under externally applied pressure. Typically a semi-solid to glassy solid adjuvant has the consistency of wax, paste, tar or gel, like petrolatum. Certain preferred perfluorophenanthrene oligomer adjuvant discussed below is brittle enough to shatter on impact with a hard object.

The term "nonfugitive" means that the adjuvant does not significantly vaporize, leach away or otherwise depart from the blend with the fluoropolymer during preparation of the blend, fabrication of a membrane from the blend or during use of the membrane in a separation process. Typically, the adjuvant has a room temperature vapor pressure below about 0.2 mm Hg. Preferably the nonfugitive adjuvant has a boiling point of higher than about 200° C. at atmospheric pressure. It is also preferred that the nonfugitive adjuvant have a molecular weight below about 10,000 g/mole. As to composition the adjuvant contains carbon atoms and is highly substituted with fluorine. More preferably the carbon of the adjuvant is perfluorinated.

Among other considerations, the nonfugitive, nonpolymeric fluorinated adjuvant is selected primarily for its ability to alter the selectivity of the fluoropolymer membrane to a given pair of gases. Selectivity alteration capability can be tested by measuring the selectivity of a fluoropolymer membrane composition to permeability by a pair of gases of interest. In a separate test, the selectivity to the same gases of a membrane composed of a blend having a major fraction of the fluoropolymer and a minor fraction of a candidate adjuvant, (e.g., 75 wt. % fluoropolymer/ 25 wt. % adjuvant) is determined. An increase of selectivity of the blend at least 5 % greater than the selectivity of the fluoropolymer free of adjuvant indicates that the adjuvant has selectivity altering activity. The adjuvant is also selected for its compatibility and ease of blending with the fluoropolymer.

Representative nonfugitive, nonpolymeric fluoriated adjuvants include perfluoroperhydrophenanthrene (Flutec Division of British Nuclear Fuels), FC-70 Fluorinert® Electronic Liquid (3M Corporation, Minneapolis, Minn.) a 15 carbon chain length perfluorocarbon compound having a boiling point of 215° C., and Krytox® perfluoroalkylether (E. I. du Pont de Nemours & Co., Wilmington, Del.). Krytox® perfluoroalkylether is believed to have the formula F—[C(CF$_3$)F—CF$_2$—O]$_{n—CF2}$CF$_3$ in which n is about 10 to 60. Perfluoro(tetradecahyrophenanthrene) is preferred. It is available from Flutec division of British Nuclear Fuels in several forms such as "PP 11" having the formula [C$_{14}$F$_{24}$]$_n$ which is sold in a solvent grade believed to be monomeric perfluoro(tetradecahyrophenanthrene) liquid of molecular weight of about 650 and in oligomer grade of molecular weight of about 1200–2400. It is also available as 2 w/w % and 5 w/w % solutions of PP11 oligomer in a low-boiling, volatile perfluorocarbon liquid, designated "LE12" and "LE15", respectively.

The fluoropolymer and adjuvant can be blended together directly to form a masterbatch. This can be accomplished by compounding in conventional mechanical mixing equipment such as single screw or twin screw continuous compounding extruders, batch compounding mixers and roll mills. The masterbatch can then be pressed, calendered or extruded to form a membrane. Preferably the masterbatch is dissolved in a suitable solvent and formed into a membrane by spraying, dipping, roller coating, or casting process followed by evaporation of the solvent. The fluoropolymer and adjuvant can also be dissolved separately in a solvent to form two solutions. Dilute solutions of less than about 10 wt. % solute in fluorinated solvents are preferred. These solutions are then mixed in proportions effective to produce the blend of desired composition. The blended solution then is processed and the solvent evaporated to form a membrane.

Representative solvents include mixtures of $C_6F_{14}$, $C_7F_{16}$ or $C_8F_{18}$ isomers, fluorinated mixtures containing $(C_4F_9)_2NCF_3$ (e.g., Fluorinerts® FC-40 from 3M Co.), perfluoro-n--methylmorpholine, perfluoro-2-n-butyltetrahydrofuran and $C_8F_{16}O$ cyclic ether mixtures containing perfluoro-2-n-butyltetrahydrofuran (e.g., Fluorinerte® FC-75 from 3M Co.), perfluorotributylamine and perfluorotriamylamine, 1,1,1,2,3,4,4,5,5,5-decafluorpentane (Vertrel® XF), and 1,1,2,3,3,3-hexafluoropropylene oxide ("PFS-1"from Ausimont, S.p.A., Milan, Italy). PFS-1 is preferred.

The fluoropolymer should constitute a major fraction (i.e., at least 50 wt. %) of the membrane. If the fluoropolymer component is diluted to less then about 50 wt. %, the membrane tends to become too soft to retain its physical form under membrane fabrication or operating conditions. The adjuvant thus constitutes a minor fraction, and preferably at least 1 wt. %. The proportion of adjuvant to fluoropolymer is selected to produce the desired selectivity of the selectively gas permeable membrane. The membrane should consist essentially of the fluoropolymer and the adjuvant. By "consist essentially of" is meant that other components can be present provided the additional components do not significantly affect the operation of the invention to alter the selectivity of the membrane. Other ingredients can include fillers or diluents, for example, to render the membrane less costly to produce.

The membrane should be nonporous to be selective for the gases of interest and to assure that incorporation of adjuvant is effective to alter selectivity. The nonporous membrane can be free standing or applied for support to a substrate, which can be porous. The membrane can be a flat film, pleated, spiral wound, ribbon tube, or other conventional shape. In a preferred embodiment, the nonporous selectively gas permeable membrane is applied as a layer or coating on a microporous hollow fiber substrate. The membrane can be on the inside (lumen surface), outer surface or both surfaces of the hollow fiber. Representative substrate materials include polyethylene, polypropylene, polysulfone, polyether sulfone, cellulose ester polymer, polyvinylidene fluoride, polytetrafluoroethylene, perfluoroalkoxy polymer, such as polyperfluoropropylvinyl ether and polyperfluoromethylvinyl ether, polyamide, porous metal and porous ceramic.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

Examples 1–5 and Comparative Example 6

Polymer compositions blended with adjuvant and the same polymer compositions free of adjuvant were prepared. Membrane structures were fabricated from these compositions and tested as follows. For adjuvant free composition membrane structures, the polymer composition was dissolved in PFS-1 solvent to obtain a 1 wt. % solution. The solution was sprayed onto a microporous flat sheet of pore size 0.1 μm using a Crescendo model 175-5 air brush. Immediately after spraying, the sheet was placed in an oven to devolatilize the solvent. A 25 mm disc was punched from the sheet, weighed and compared to the weight of a same size but uncoated disc. The coating thickness was thus determined. For membrane structures of polymer blended with adjuvant, this procedure was repeated except that a specified adjuvant was also dissolved in the solvent in desired proportion. The total concentration of the polymer and adjuvant in solution was 1 wt. %. Compositions and membrane fabrication details are shown in Table 1.

Results are shown in Table II. For convenience in evaluating the data presented in Tables I and II it is noted that examples of polymer free of adjuvant are designated "A". In all cases for Examples 1–5, the membrane fabricated from the polymer/adjuvant blend had a higher selectivity for each gas pair than a membrane made from the polymer free of the adjuvant. The degree of selectivity increase varied with the combination of polymer and adjuvant. For example, the oxygen to nitrogen selectivity of PDD/TFE/MA copolymer was increased by about 52% (Ex. 1B vs. 1A) while the selectivity to the same gases at the same level of adjuvant incorporation increased the selectivity of 65 PDD/35 TFE by about 25% (Ex. 3K vs. 3A). In a broad sense, the more adjuvant incorporated, the greater the selectivity increase. Compare Ex. 3B, C, D and G to Ex. 3A, and Ex. 4B, C and

TABLE I

| Example | Polymer[6] | Adjuvant | Polymer to Adjuv't ratio | Thickness μm | Sheet | Oven Time min. | Oven Temp. ° C. |
|---|---|---|---|---|---|---|---|
| 1A | PDD/TFE/MA[13] | — | — | 6.53 | PES | 20 | 60 |
| 1B | PDD/TFE/MA[13] | PP11 oligomer | 3 | 10.4 | PES | 20 | 60 |
| 2A | PDD/CTFE[1] | — | — | 4.78 | PES | 20 | 60 |
| 2B | PDD/CTFE[1] | PP11 oligomer | 3 | 6.2 | PES | 20 | 60 |
| 3A | 65 PDD/35 TFE[2] | — | — | 3.80 | PES | 20 | 60 |
| 3B | 65 PDD/35 TFE[2] | PP11 oligomer | 19 | | PES | 20 | 60 |
| 3C | 65 PDD/35 TFE[2] | PP11 oligomer | 9 | | PES | 20 | 60 |
| 3D | 65 PDD/35 TFE[2] | PP11 oligomer | 3 | 2.55 | PES | 20 | 60 |
| 3E | 65 PDD/35 TFE[2] | PP11 oligomer | 3 | | PVDF[10] | 60 | RT[8] |
| 3F | 65 PDD/35 TFE[2] | PP11 solvent | 3 | | PES | 20 | 60 |
| 3G | 65 PDD/35 TFE[2] | PP11 oligomer | 1 | 0.83 | PES | 30 | 70 |
| 3H | 65 PDD/35 TFE[2] | PP11 oligomer | 1 | | ePTFE[5] | 20 | RT[8] |
| 3I | 65 PDD/35 TFE[2] | PP11 oligomer | 1 | | ePTFE[5] | 30 | 70 |
| 3J | 65 PDD/35 TFE[2] | GPL 105[11] | 3 | | PES | 10 | 65 |
| 3K | 65 PDD/35 TFE[2] | GPL 107[12] | 3 | | PES | 10 | 65 |
| 3L | 65 PDD/35 TFE[2] | Fluorinert FC-70 | 3 | 2.25 | PES | 30 | 60 |
| 4A | 87 PDD/13 TFE[3] | — | — | 5.12 | PES | 20 | 60 |
| 4B | 87 PDD/13 TFE[3] | PP11 oligomer | 9 | | PES | 20 | 60 |
| 4C | 87 PDD/13 TFE[3] | PP11 oligomer | 5.67 | | PES | 20 | 60 |
| 4D | 87 PDD/13 TFE[3] | PP11 oligomer | 4 | | PES | 60 | 60 |
| 5A | AD60X[7] | — | — | 23 | —[9] | 720 | RT[8] |
| 5B | AD60X[7] | PP11 oligomer | 4 | | PVDF[10] | 30 | 60 |
| 5C | AD60X[7] | PP11 oligomer | 11.5 | | —[9] | 720 | RT[8] |
| Comp. Ex. 6A | PDOH[4] | — | — | 5.64 | PES | 20 | 60 |
| Comp. Ex. 6B | PDOH[4] | PP11 oligomer | 3 | 19.5 | PES | 20 | 60 |

Notes to Table I:
[1]Teflon ® AF 2130 (DuPont, Wilmington, Delaware) 75 PPD/25 CTFE
[2]Teflon ® AF 1600
[3]Teflon ® AF 2400
[4]PDOH = poly(1,1,2,4,4,5,5,6,7,7-decafluoro-3-oxa-1,6-heptadiene)
[5]ePTFE = expanded polytetrafluoroethylene, sheet pore size was 0.05 μm.
[6]Comonomer proportions of polymer compositions shown in mole %
[7]AD60X = 2,2,4-trifluoro-5-trifluoromethyl-1,3-dioxole (Ausimont Hyflon ® AD60X)
[8]Solvent removed from samples at ambient room temperature.
[9]Thick film cast by pouring solution onto glass.
[10]Millipore type VVPP poly(vinylidene fluoride) 0.1 μm pore size sheet surface treated to be hydrophilic
[11]Krytox ® GPL 105 Perfluoroalkylether oil of 550 centistoke viscosity at 20° C. and 3 centistoke at 204° C. (ASTM D445), oil viscosity index 134 (ASTM D2270), pour point −36° C. (ASTM D97), density 1.94 g/ml at 0° C. and 1.76 g/ml at 100° C., volatility % in 22 hours <1 at 66° C. and <10 at 204° C. (ASTM D972).
[12]Krytox ® GPL 107 Perfluoroalkylether oil of 1600 centistoke viscosity at 20° C. and 6 centistoke at 204° C. (ASTM D445), oil viscosity index 155 (ASTM D2270), pour point −30° C. (ASTM D97), density 1.95 g/ml at 0° C. and 1.78 g/ml at 100° C. volatility % in 22 hours <1 at 204° C. (ASTM D972).
[13]30.7 mole % TFE, 68.4 mole % PDD, 0.9 mole % maleic anhydride The disc was placed into a Millipore 25 mm stainless steel gas test cell and the permeabilities through the disc of $N_2$, and $O_2$ were measured in all examples. For certain examples $CO_2$, He and $CH_4$ permeabilities were also measured. The separation factors for $O_2/N_2$, $He/N_2$ and $CO_2/CH_4$ were then calculated from the empirically determined permeability data.

D, to Ex. 4A. The $O_2/N_2$ separation factor increase observed between Ex. 4B and 4A is about 3 %. Preferably, the increase of selectivity generated by the incorporation of adjuvant should be at least about 5%, more preferably about 10%.

In Comparative Examples 6A and 6B the adjuvant caused a decrease in the selectivity relative to the adjuvant free polymer membrane. These examples thus demonstrate that an adjuvant which functions to increase selectivity of membranes of certain fluoropolymers does not necessarily perform the same function with all fluoropolymers. Given the guidance provided by the present disclosure, one of ordinary skill in the art should be able to determine without undue experimentation that a given nonfugitive, nonpolymeric, fluorinated adjuvant affects the selectivity of a particular selectively gas permeable fluoropolymer membrane. This is accomplished simply by measuring the separation factor for a desired gas binary using a membrane of fluoropolymer free of any nonfugitive, nonpolymeric, fluorinated adjuvant and comparing it to the separation factor obtained from a membrane fabricated with at least about 1:20 weight ratio of adjuvant to polymer and preferably at least about 1:3 weight ratio. The results will show whether incorporation of the adjuvant increases selectivity.

data points for membranes of fluoropolymer blended with adjuvant according to this invention are shown in filled-in form. Straight line R shows the upper limit of prior art data published by Robeson (1991), mentioned above for the oxygen-nitrogen gas system.

Inspection of plotted relationship between data points 1A and 1B demonstrates that blending PP11 oligomer to 25% in PDD/TFE/MA copolymer moves the separation properties of the membrane upward and to the left generally parallel to the Robeson limit line R. Comparison of data point 3A to 3K shows a similar performance change with a different adjuvant (i.e., perfluoroalkylether oil) and a 65 PDD/35 TFE fluoropolymer. PP11 oligomer added to the same fluoropolymer dramatically increases selectivity as seen by comparing point 3A to points 3D-1, 3D-2 and 3E-3. The 15 carbon FC-70 perfluorocarbon oil (point 3L-2) causes a similar increased sensitivity to this fluoropolymer.

TABLE II

| | Permeance (GPU$^2$) | | | | | Separation Factor | | |
|---|---|---|---|---|---|---|---|---|
| | $N_2$ | $O_2$ | $CO_2$ | He | $CH_4$ | $O_2/N_2$ | $He/N_2$ | $CO_2/CH_4$ |
| 1A | 30.7 | 87.6 | 216.1 | 280.5 | 14.9 | 2.85 | 9.14 | 14.5 |
| 1B | 1.58 | 6.85 | 18.6 | 50.3 | 0.69 | 4.34 | 31.8 | 27.0 |
| 2A | 150.6 | 339.6 | 902.7 | 758.2 | 89.2 | 2.25 | 5.03 | 10.12 |
| 2B-1$^1$ | 5.65 | 29.9 | 73.5 | 173.5 | 1.08 | 5.29 | 30.7 | 68.1 |
| 2B-2 | 5.13 | 29.4 | 70.4 | 146.8 | 0.88 | 5.73 | 28.6 | 80.0 |
| 3A | 30.1 | 76.6 | 295.7 | 283 | 15.4 | 2.5 | 9.4 | 19.2 |
| 3B-1 | 71 | 212 | | 747 | | 2.99 | 10.5 | |
| 3B-2 | 22.2 | 67.4 | | 235 | | 3.04 | 10.6 | |
| 3C-1 | 11.2 | 38.5 | | 154 | | 3.44 | 13.8 | |
| 3C-2 | 17 | 50.5 | | 215 | | 2.98 | 12.7 | |
| 3D-1 | 5.37 | 22.48 | 45.6 | 214.1 | 0.91 | 4.19 | 39.9 | 50.3 |
| 3D-2 | 5.79 | 27.1 | | 225 | | 4.68 | 38.9 | |
| 3D-3 | 6.17 | 27.8 | | 184 | | 4.51 | 29.8 | |
| 3E-1 | 5.3 | 18.8 | | 209 | | 3.56 | 39 | |
| 3E-2 | 4.2 | 15.4 | | 210 | | 3.66 | 50 | |
| 3E-3 | 3.1 | 15.8 | | 139 | | 5.11 | 45 | |
| 3F | 6.56 | 24.3 | | 99.6 | | 3.7 | 15.2 | |
| 3G | 10.8 | 46.3 | 107 | 364 | 2.46 | 4.29 | 33.7 | 43.5 |
| 3H | 6.9 | 28.5 | 67.8 | 241 | | 4.13 | 35 | |
| 3I | 8.6 | 42.5 | 102 | 334 | | 4.94 | 38.8 | |
| 3J-1 | 26.5 | 83.8 | | 392 | | 3.16 | 14.8 | |
| 3J-2 | 22.7 | 71.1 | | 311 | | 3.13 | 13.7 | |
| 3K | 28.4 | 88.9 | | 435 | | 3.13 | 15.3 | |
| 3L-1 | 10.5 | 33.6 | | 218 | | 3.2 | 20.8 | |
| 3L-2 | 6.9 | 30 | 52.3 | 214 | 135 | 4.35 | 31.0 | 25.5 |
| 4A | 214 | 416 | 1,054 | 839 | 135 | 1.94 | 3.91 | 6.21 |
| 4B | 320 | 641 | | 1,600 | | 2.00 | 5.00 | |
| 4C | 157 | 350 | | 991 | | 2.23 | 6.34 | |
| 4D | 170 | 404 | | 1,316 | | 2.37 | 7.74 | |
| 5A | 8.65 | 14.87 | | | | 1.7 | | |
| 5B | 1.15 | 3.47 | 5.2 | 41.9 | | 3.02 | | |
| 5C | 0.0035 | 0.0102 | | | | 3.33 | | |
| Comp. Ex. 6A | 0.452 | 2.25 | | 19.6 | | 4.97 | 43.4 | |
| Comp. Ex. 6B-1 | 1.05 | 3.53 | | 29.9 | | 3.38 | 28.6 | |
| Comp. Ex. 6B-2 | 0.623 | 2.23 | | 10.3 | | 3.58 | 16.5 | |

$^1$repeat determinations indicated by -n where n is the determination number.
$^2$(cm$^3$ at standard temperature and pressure/cm$^2$-s-cm Hg × 10$^{-6}$)

FIG. 1 illustrates important aspects of the present invention with respect to several of the examples mentioned above. More specifically it is a plot of the logarithm of oxygen/nitrogen selectivity versus log of oxygen permeability in barrers for examples 1, 2 and certain of examples 3. Data point labels correspond to example identifications presented in Tables I and II. Data points for membranes of unblended fluoropolymers are shown in outline form while The selectivity increase caused by addition of PP11 oligomer to PDD/CTFE copolymer is most impressively demonstrated by comparison of points 2A to 2B-1 and 2B-2. Adjuvant addition causes permeance to drop by about the same order of magnitude as in the previously mentioned examples but increases the selectivity at a rate exceeding the slope of the Robeson limit line R. Furthermore, the selectivity achieved by this PP11 oligomer-fluoropolymer blend is significantly far above the limit line and thus demonstrates superior performance beyond the recognized empirically determined historical maximum.

Example 7

A gas permeable membrane was formed from a blend of 65 mole % PDD/35 mole % TFE copolymer and PP11 oligomer as described in Example 3H except that the weight ratio of polymer to adjuvant was 3:1 and the polymer was sprayed onto a 0.1 μm pore size substrate and membrane-substrate composite was cut to fit a 47 mm diameter gas permeation cell. A control membrane of the same PDD/TFE copolymer only was formed on a similar ePTFE substrate. Helium and chlorine gas were each independently allowed to permeate the membrane at room temperature and controlled pressure. Each gas was placed on one side of the membrane at tabulated pressure and the flow through the membrane was determined using a microrotameter calibrated for the gas being measured. The transmembrane flux measurements are shown in Table III. Pressures are in absolute pressure units.

TABLE III

|  | Polymer-only Membrane | | Blend Membrane | |
| --- | --- | --- | --- | --- |
|  | Flow (GPU) | Pressure (KPa) | Flow (GPU) | Pressure (KPa) |
| Chlorine | 63 | 150 | 12.3 | 235 |
|  | 68 | 156 | 14 | 296 |
|  | 66 | 161 |  |  |
|  | 102 | 201 |  |  |
|  | 173 | 233 |  |  |
| Helium | 468.1 | 180 | 119.2 | 174 |

For the polymer-only membrane interpolated chlorine flux data indicated that flux at 180 KPa would have been 84.2 GPU from which a helium/chlorine selectivity of 5.56 was calculated. The chlorine flux through the polymer/adjuvant blend membrane was calculated to be 10.8 GPU at 174 KPa by extrapolation of the tabulated data. Hence the calculated helium/chlorine selectivity of the blend membrane was 11.0 or about twice the selectivity of the control.

This example demonstrates that the adjuvant-containing membrane composition provides an increased selectivity over the control while withstanding chemical attack by highly reactive chlorine gas.

Although specific forms of the invention have been selected for illustration in the examples and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for separating gases present in a gas mixture comprising contacting the gas mixture with one side of a selectively gas permeable membrane having a membrane separation factor with respect to two gases in the mixture, the membrane comprising a blend of a major fraction of a fluoropolymer of which a nonporous membrane exhibits a fluoropolymer separation factor with respect to the two gases, and an amount of a nonfugitive, nonpolymeric fluorinated adjuvant having an atmospheric boiling point at least about 200° C., the amount being effective to make the membrane separation factor greater than the fluoropolymer separation factor.

2. The process of claim 1 in which the two gases are chlorine and hydrogen.

3. The process of claim 1 in which one of the two gases is hydrogen fluoride.

4. A membrane composition for separation of components of a mixture including a more preferentially permeable gas and a less preferentially permeable gas of a binary gas combination comprising a nonporous gas permeable membrane of a blend comprising about 50–99 wt % of a fluoropolymer and an amount of a nonfugitive, nonpolymeric fluorinated adjuvant effective to produce a separation factor of the membrane with respect to the two gases of the binary gas combination greater than the separation factor of a membrane consisting essentially of the fluoropolymer.

5. The composition of claim 4 in which the fluoropolymer comprises at least one monomer selected from the group consisting of tetrafluoroethylene, chlorotrifluoroethylene, perfluoro-2,2-dimethyl-1,3-dioxole, 2,2,4-trifluoro-5-trifluoromethyl-1,3-dioxole, hexafluoropropylene, vinylidene fluoride, and a perfluoroalkylvinyl ether.

6. The composition of claim 5 in which the monomer is perfluoro-2,2-dimethyl-1,3-dioxole.

7. The composition of claim 6 in which the adjuvant is perfluoroperhydrophenanthrene.

8. The composition of claim 4 in which the adjuvant is a perfluorinated hydrocarbon having a molecular weight of about 500–3000.

9. The composition of claim 8 in which the adjuvant is perfluoroperhydrophenanthrene.

10. The composition of claim 4 in which the adjuvant is a fluorinated liquid selected from the group consisting of FC-70, perfluoroalkylether and a mixture of them.

11. The composition of claim 4 in which the fluoropolymer is a copolymer comprising copolymerized perfluoro-2,2-dimethyl-1,3-dioxole and chlorotrifluoroethylene and in which the adjuvant comprises perfluoroperhydrophenanthrene.

12. A gas separation device comprising a selectively gas permeable membrane having a membrane separation factor with respect to two gases, the membrane comprising a blend of a major fraction of a fluoropolymer of which a nonporous membrane exhibits a fluoropolymer separation factor with respect to the two gases, and an amount of a nonfugitive, nonpolymeric fluorinated adjuvant effective to make the membrane separation factor greater than the fluoropolymer separation factor.

13. The device of claim 12 in which the selectively gas permeable membrane comprises a blend of about 50–99 wt % of a fluoropolymer comprising at least one monomer selected from the group consisting of tetrafluoroethylene, chlorotrifluoroethylene, perfluoro-2,2-dimethyl-1,3-dioxole, 2,2,4-trifluoro-5-trifluoromethyl-1,3-dioxole, hexafluoropropylene, vinylidene fluoride, and a perfluoroalkylvinyl ether, and a complementary amount of perfluoroperhydrophenanthrene and in which the selectively gas permeable membrane is supported by a porous substrate adjacent to the selectively gas permeable membrane.

14. The device of claim 13 in which the porous substrate comprises expanded polytetrafluoroethylene.

15. A process for making a gas separation membrane comprising the steps of mixing a fluoropolymer comprising a monomer selected from the group consisting of tetrafluoroethylene, chlorotrifluoroethylene, perfluoro-2,2-dimethyl-1,3-dioxole, 2,2,4-trifluoro-5-trifluoromethyl- 1,3-dioxole hexafluoropropylene, vinylidene fluoride and a perfluoroalkylvinyl ether, and a nonfugitive, nonpolymeric fluorinated adjuvant to obtain a uniform composition of which the fluoropolymer comprises a major fraction, and fabricating a nonporous gas permeable membrane of about 0.05–50 μm thickness from the composition.

16. The process of claim 15 in which the mixing step comprises blending the fluoropolymer and the adjuvant in a liquid solution comprising a fluorinated solvent.

17. The process of claim 16 in which the mixing step comprises dissolving the fluoropolymer in a first fluorinated solvent to form a first solution of about 0.5–10 wt. % fluoropolymer in the first fluorinated solvent and dissolving the adjuvant in a second fluorinated solvent to form a second solution of about 0.5–10 wt. % of the adjuvant in the second fluorinated solvent, and combining an amount of the first solution with an amount of the second solution to form the liquid solution of the uniform composition dissolved in the fluorinated solvent.

18. The process of claim 17 in which the fabricating step comprises evaporating the fluorinated solvent from the liquid solution to produce a substantially solvent free membrane of the composition.

19. The process of claim 18 in which the fabricating step further comprises spraying the liquid solution onto a surface of a porous substrate prior to evaporating the fluorinated solvent.

* * * * *